(12) United States Patent
Weinberger et al.

(10) Patent No.: US 6,366,743 B1
(45) Date of Patent: Apr. 2, 2002

(54) IMAGE PROCESSING DEVICE

(75) Inventors: Joseph Weinberger, East Brunswick, NJ (US); William H. Webb, Jr., Old Saybrook, CT (US)

(73) Assignee: The Weinberger Group, LLC, East Brunswick, NJ (US)

(*) Notice: Subject to any disclaimer, the term of this patent is extended or adjusted under 35 U.S.C. 154(b) by 0 days.

(21) Appl. No.: 09/513,028

(22) Filed: Feb. 25, 2000

Related U.S. Application Data

(60) Provisional application No. 60/121,717, filed on Feb. 26, 1999.

(51) Int. Cl.[7] .................................................. G03G 15/00
(52) U.S. Cl. ............................ 399/17; 355/23; 399/374
(58) Field of Search ................................. 399/374, 363, 399/364, 16, 17; 355/23, 24, 26

(56) References Cited

U.S. PATENT DOCUMENTS

| 5,038,182 A | * | 8/1991 | Tanimoto | .................... 399/374 |
|---|---|---|---|---|
| 5,515,153 A | * | 5/1996 | Tokunoh | ...................... 355/320 |
| 5,751,438 A | * | 5/1998 | Murai et al. | ................. 358/403 |

FOREIGN PATENT DOCUMENTS

| JP | 05-30305 | * | 2/1993 |
| JP | 7-36235 | * | 2/1995 |
| JP | 9-26676 | * | 1/1997 |

* cited by examiner

Primary Examiner—Joan Pendegrass
(74) Attorney, Agent, or Firm—Hedman & Costigan, P.C.

(57) ABSTRACT

An image processing device comprising a second side image sensor to determine whether the second side of a document also requires processing. The second side image sensor preferably uses a camera or measures reflected infrared light with an infrared photosensor. The invention relates to a wide variety of image processing devices such as copy machines, facsimile machines, annotators, scanners, printers, etc., which process documents. When the system detects an image or markings on the second side of a document it may merely alert the user or automatically process the second side of the document without additional user interaction.

4 Claims, 4 Drawing Sheets

IMAGE PROCESSING DEVICE

REFERENCE TO RELATED APPLICATION

This application is a regular utility application which claims priority to U.S. provisional application No. 60/121,717 filed Feb. 26, 1999.

FIELD OF THE INVENTION

The present invention relates to image processing devices and more particularly to document handling on image processing devices.

BACKGROUND OF THE INVENTION

Image processing devices are generally exemplified by copy machines, printers, facsimile machines, annotators, scanners, etc. These and like devices have document handlers or feeders for moving documents past an image processing element such as a photocell to capture an image for copying, printing, sending, storing, etc., a document or a printhead to print on the document.

As seen on current copy machines, document handlers and feeders can be quite sophisticated. They move a document to be copied from a stack in a hopper or feed mechanism to over the glass platen for copying and back into a stack. For example, if paper runs out during copying of a stack, the copier recalls the location at which processing stopped and allows the user to go back to the location when paper is replenished. The known document handlers also make two sided copying easy by copying one side of a sheet, holding the copied sheets, then turning over the documents and copying the second side of the document onto the backs of the copies so that the copies identically replicate the document.

To obtain two sided processing, however, the document must be presented as a two sided document by the user. If not preselected, the second sides need to be processed separately and integrated into the first sides, or they are simply missed and excluded from the processing.

It is therefore an object of the present invention to ensure that documents having second side images are properly processed in an image processing device.

SUMMARY OF THE INVENTION

This and other objects are achieved by the present invention which relates to an improvement in an image processing device comprising an image detector for determining whether an image appears on the second side of a document being processed. If an image does appear, the image processing device will process the second side of the document either through user notification and intervention or automatically.

It is further contemplated as an improvement to an image processing device to include an image sensor on the first side of the document being processed so that if no image appears thereon it need not be processed.

BRIEF DESCRIPTION OF THE DRAWINGS

The following drawings, in which like reference characters represent like parts, are presented to illustrate the invention and are not intended to limit the invention in any manner whatsoever.

DETAILED DESCRIPTION OF THE PREFERRED EMBODIMENT

In its preferred embodiment, the present invention relates to an improvement in a document processing device, such as a copy machine 2, facsimile machine, printer, annotator or the like. The improvement comprises an image sensor 4 which can detect the presence and/or absence of an image on the second side of a document as it is being processed.

Image detection devices are known in the art and any such suitable device can be used in connection with the present invention. One such image detector is the CV Series Vision System produced by Keyence Corp. of America, Woodcliff Lake, N.J. The CV Series Vision System includes a micro CCD camera and controller offering a processing time of 1/60 of a second, 240,000 pixel resolution, 1/10,000 second synchronizing shutter, auto tracking and 256 level gray search.

Any such device, however, which is capable of determining whether a document has an image thereon, is contemplated herein. Of course, particular sensor limits can be overcome by using more than one sensor to view the sheet being processed.

Figure 1:
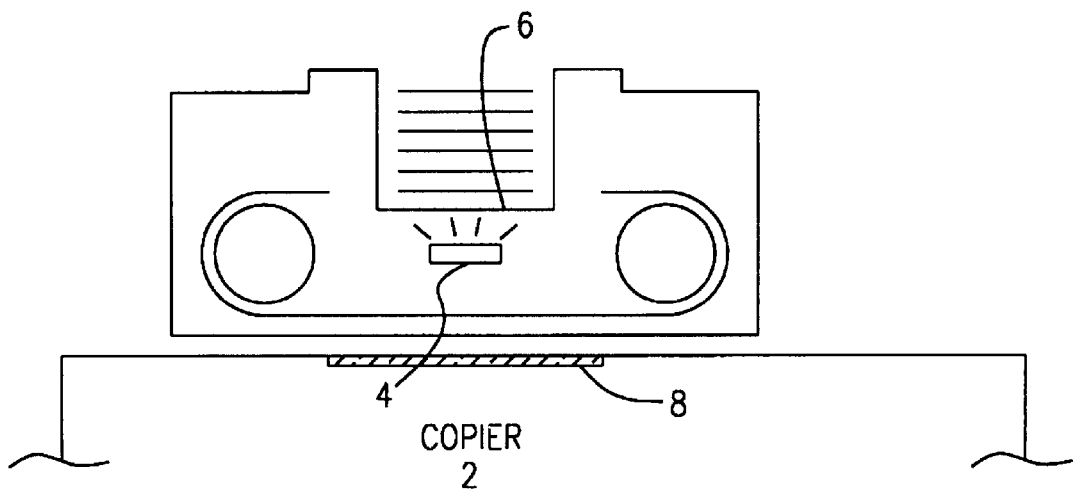
FIG. 1 is a schematic of an image processing device incorporating the second side detection device of the present invention.
Figure 2:
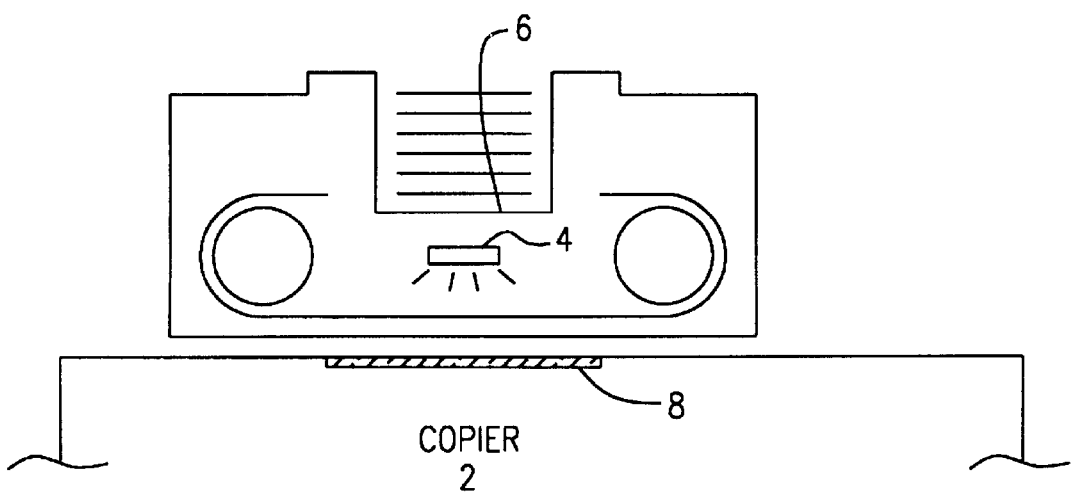
FIG. 2 is a schematic of an image processing device incorporating the second side detection device of the present invention.
Figure 3:
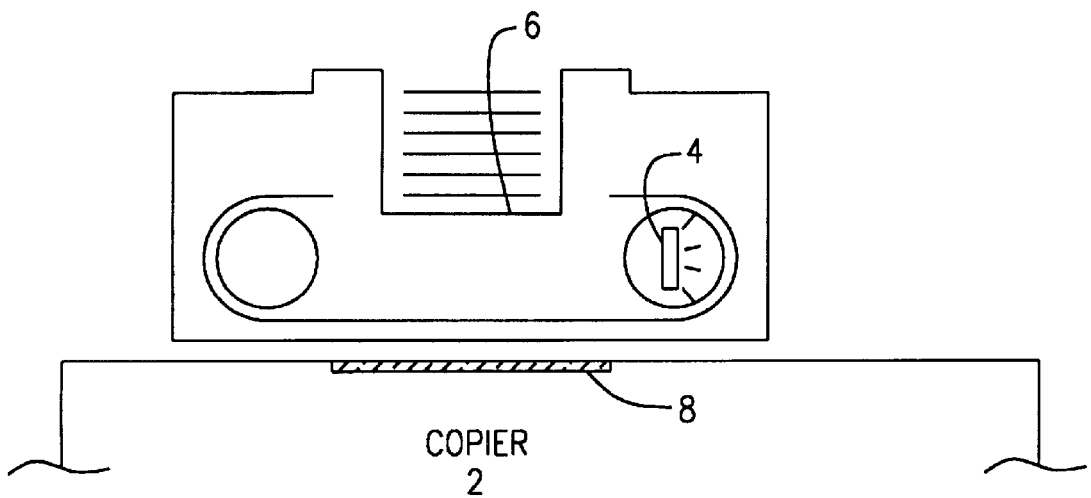
FIG. 3 is a schematic of an image processing device incorporating the second side detection device of the present indention.

When a document is placed in a document handler 6 or 6a of an image processing machine, it is placed on or moved across the image processing element, i.e. the glass platen of a copier, photocell of a facsimile machine or scanner, the printhead of a printer or annotator, etc. The image sensor of the present application is preferably situated on the document path, before (FIGS. 1 and 3), at the point that (FIG. 2) or after (not shown) the document passes over the image processing element. The image sensor detects whether the second side of the document has an image thereon and triggers the image processing device to deal accordingly, by turning the document over for processing the second side or alerting the user of the fact that a sheet or more of the document has an image on the second side.

In its preferred embodiment, a document is stacked into a document handler 6 of a copy machine 2 face up. As the document begins to be engaged by the handler 6, an image sensor located under the stack scans the second side of the document (see FIG. 1). To aid detection, the document handler may have a clear or translucent belt, such as a mylar belt, so that the image can be detected therethrough. Similarly, the image sensor may be internal to a clear or translucent roller, possibly made of LEXAN or a polycarbonate to allow the image to project therethrough (see FIG. 3). Alternatively, the image sensor can comprise a series of sensors 10 located adjacent two areas 11 where transport belts pass to move the document (see FIG. 6).

If no image is detected on the second side of the sheet, it is passed through the processing device as normal. If an image is detected on the second side, the sheet may go through normally and then be followed by a flip of the sheet to process the second side.

Alternatively, the document handler can scroll through all sheets, and the copier control can keep count of the sheets moved while the second side of each sheet is reviewed by the image sensor. If the image sensor detects an image, it is preferred that the control computer will determine which of the second sides need to be processed. The processing device can then automatically process the necessary second sides, or all second sides to ensure that the entire document has been processed.

Figure 6:
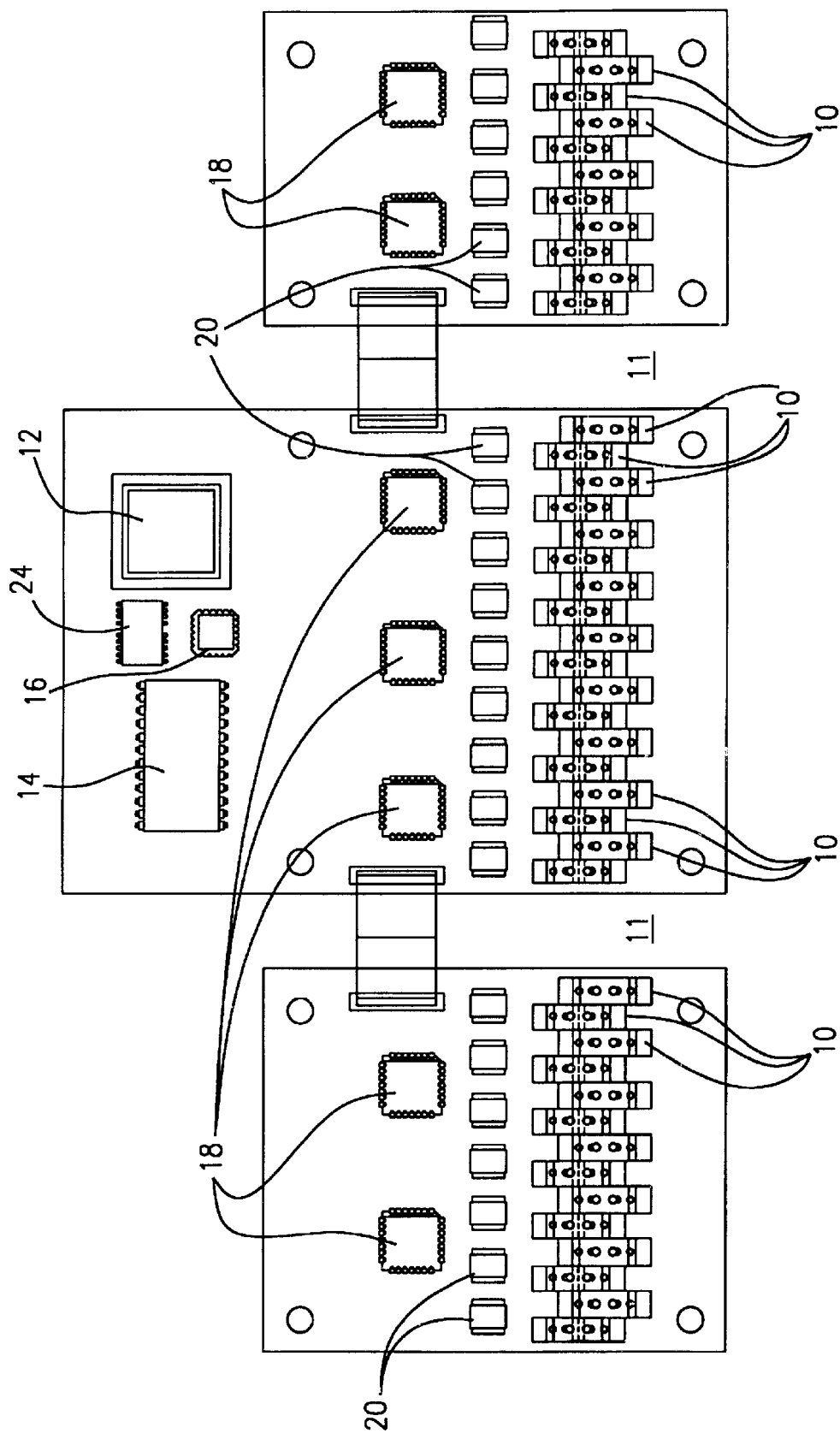
FIG. 6 is a plan view of a sensor arrangement suitable for use with the present invention.

Although a camera system as described above in the Keyence Corp. CV Series vision system is preferred for accuracy, a reflective infrared system is a preferred low cost option. A preferred infrared second side detect circuit is shown in FIG. 6.

This circuit consists of an Intel 8051 series microprocessor 12 with memory and address decoding components used to monitor and interpret the voltage levels from reflective type infrared sensors 10. Infrared light is projected onto the second side of the document and reflected back to a photo transistor 10 that is sensitive to infrared light. The amount of light reflected is proportional to the albedo of the reflecting surface and therefore the voltage received by the analog to digital converter 18 is proportional also. Blank paper would be very reflective where markings or images on the paper would absorb the infrared light.

The Intel 8051 series microprocessor 12 with memory 14 and address 16 decoding components and an address latch 24 polls the sensors 10 whose voltage output is fed into analog to digital converters 18. The sensor sensitivity levels are set by digital potentiometers 20 controlled by an 12C bus. During calibration the main control computer is linked with this second side detect computer, preferably using a serial port. The actual voltage levels can be seen and set at this time.

In the run mode the second side detect control computer software in the microprocessor 12 determines whether or not marks or images have been detected on the second side. A valid detection is converted into a TTL output sent from the second side detect computer 12 and received by the image processing device main control computer, preferably through the TTL input port. The main computer responds accordingly and advises the user or automatically acts to process the second side of the document.

Although this invention has been generally described on a copy machine, it is understood that it is equally applicable to a scanner, facsimile machine, etc. where the image sensor is merely arranged to detect whether the second side has an image which can then be processed or the user alerted to the existence of an image on the second side.

Figure 4:
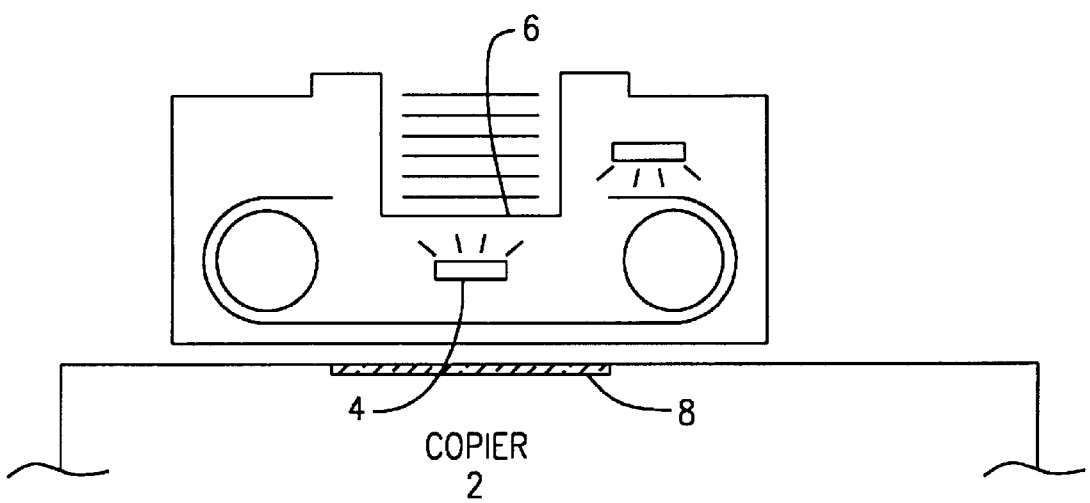
FIG. 4 is a schematic of an image processing device incorporating the second side detection device of the present invention.
Figure 5:
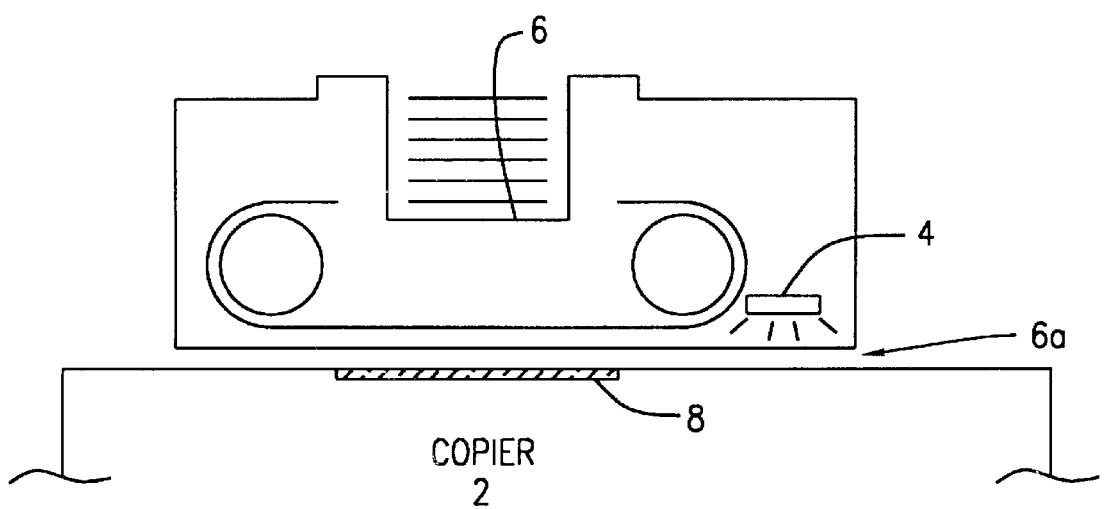
FIG. 5 is a schematic of an image processing device incorporating the second side detection device of the present invention.

Additionally, or alternatively, a first side image sensor can be used to ensure that a sheet being processed does indeed have an image to process (see FIG. 4). This would eliminate the processing of blank pages which wastes time and resources.

The method for processing the document would therefore include scanning a second side of the document and either alerting the user to the existence of sheets having images on the second side or processing the first side then processing the second side automatically to ensure that all images in a document have been processed.

Variations of the above will make themselves apparent to one skilled in the art reading this description. All such variations are considered to fall within the spirit and scope of the present invention.

What is claimed is:

1. An image processing device comprising one or more sensors for detecting an image on a second side of a document being processed in the device wherein the one or more sensors are operatively connected to one or more digital potentiometers for setting sensitivity.

2. The device of claim 1 wherein the sensors are taken from the group consisting of a camera and infrared photo receptors.

3. The device of claim 1 further comprising a microprocessor operatively connected to the sensors for determining whether an image is sensed on the second side of the document.

4. The device of claim 1 wherein the image processing device includes a control computer and the microprocessor is operatively connected to the control computer of the image processing device.

* * * * *